US007337156B2

(12) United States Patent
Wippich

(10) Patent No.: US 7,337,156 B2
(45) Date of Patent: Feb. 26, 2008

(54) METHOD FOR DETECTING AND COMBATING FOREST AND SURFACE FIRES

(75) Inventor: Heinz-Georg Wippich, Voehringen (DE)

(73) Assignee: EADS Deutschland GmbH, Ottobrunn (DE)

(*) Notice: Subject to any disclaimer, the term of this patent is extended or adjusted under 35 U.S.C. 154(b) by 339 days.

(21) Appl. No.: 11/049,697

(22) Filed: Feb. 4, 2005

(65) Prior Publication Data

US 2005/0189122 A1 Sep. 1, 2005

(30) Foreign Application Priority Data

Feb. 6, 2004 (DE) ...................... 10 2004 006 033

(51) Int. Cl.
*G06F 15/00* (2006.01)
*G06F 17/00* (2006.01)
*G08B 17/12* (2006.01)
*A62C 2/00* (2006.01)

(52) U.S. Cl. .......................... 706/44; 706/60; 340/577; 340/578; 169/43; 169/46; 169/53

(58) Field of Classification Search .................. 169/53, 169/43, 45, 46, 52, 24, 54; 340/577, 578; 706/44, 60
See application file for complete search history.

(56) References Cited

U.S. PATENT DOCUMENTS 5,160,842 A * 11/1992 Johnson ................... 250/338.1
5,557,260 A 9/1996 Legaz et al.
5,832,187 A * 11/1998 Pedersen et al. .............. 706/45
5,878,356 A * 3/1999 Garrot et al. .................. 701/1
5,927,648 A * 7/1999 Woodland ................ 244/118.1
5,936,245 A 8/1999 Goillot et al.
6,084,510 A 7/2000 Lemelson et al.
6,281,970 B1 8/2001 Williams et al.
2002/0026431 A1 2/2002 Pedersen et al.

FOREIGN PATENT DOCUMENTS

DE 694 21 200 T2 8/1994
EP 0 811 400 A1 12/1997
WO WO 97/36433 A1 9/1997

OTHER PUBLICATIONS

European Search Report dated Oct. 24, 2006 with English translation of pertinent protions (Four (4) pages).

* cited by examiner

*Primary Examiner*—Davis D. Hwu
(74) *Attorney, Agent, or Firm*—Crowell & Moring LLP

(57) ABSTRACT

A method for the detection and combating of forest and surface fires includes the steps of observing and detecting fires using an infrared camera on board an observation aircraft; georeferencing image obtained by the infrared camera pixel-wise using location data of the observation aircraft as obtained by a satellite navigation system; testing the georeferenced infrared image for hot points caused by a fire, and transmitting coordinates of the hot points via a data link to a central data processing system on the ground; automatically generating deployment plans for available firefighting vehicles in the central data processing system taking into consideration data relating to the terrain and data on available firefighting equipment; transferring the deployment plans generated in the central data processing system to on-board management systems of deployed vehicles; representing deployment data and coordinates corresponding to the deployment plans with output apparatus by the on-board management systems of the deployed vehicles; and carrying out fire-fighting by the deployed vehicles in accordance with the data displayed by the on-board management systems.

15 Claims, 2 Drawing Sheets

METHOD FOR DETECTING AND COMBATING FOREST AND SURFACE FIRES

BACKGROUND AND SUMMARY OF THE INVENTION

This application claims the priority of Federal Republic of Germany Patent Document No. 10 2004 006 033.9-34, filed Feb. 6, 2004, the disclosure of which is expressly incorporated by reference herein.

The invention relates to a method for detecting forest and surface fires, planning to combat them, and combating them.

Great public assets are destroyed worldwide every year by forest and surface fires. Landscapes are damaged for long periods of time, and secondary ecological damage is as a rule inestimable. In combating large fires persons are injured and firefighters are exposed to great harm. It is not rare for fire-fighting crews to become surrounded and killed by the advancing fires.

Combating large fires is carried out as a rule on the ground by fire-fighting vehicles and by aerial fire-fighting. The coordination of the ground forces as well as of aircraft must be conducted over large areas, and is as a rule difficult or even impossible for lack of planning and communication.

The evaluation of large fires, their geographical path and the recognition and evaluation of regions of especially critical growth is performed as a rule from the air, but only with little planning support and coordination with other sources of information, such as up-to-date weather data, local wind information and/or consideration of topographical circumstances.

DE 694 21 200 T2 discloses a method for the detection of fires in open land is disclosed, in which infrared (IR) cameras positioned on the land are employed. The pictures captured by these cameras are transmitted to a central station for digital processing. If necessary, an alarm signal can be generated on the basis of the photography.

EP 0 811 400 A1 discloses a method for fire detection using an infrared camera on board an observation aircraft. The images obtained are examined for potential centers of concern.

The invention is directed to a method by which fires can be reliably detected and effective countermeasures can quickly be initiated.

In the proposed method, fires are detected from the air by means of georeferenced infrared data and these surface data are transferred to a planning and deployment center. The overall situation is appraised with a display and planning computer, and fire-fighting intervention by air and on the ground is derived therefrom and communicated to the individual fire-fighting units.

In one advantageous embodiment, the fire-fighting and effectiveness of the recommended intervention is surveyed from the air, recorded and compared at the center with the computed action, and the plans are improved as necessary. With such improvement, the method constitutes a continuous circuit made up of an appraisal of the fire situation, the reckoning of countermeasures and the monitoring of the effectiveness of these measures.

Other objects, advantages and novel features of the present invention will become apparent from the following detailed description of the invention when considered in conjunction with the accompanying drawings.

BRIEF DESCRIPTION OF THE DRAWINGS

The method of the invention is further explained hereinafter in conjunction with FIGS. 1-4.

DETAILED DESCRIPTION OF THE DRAWINGS

Figure 1:
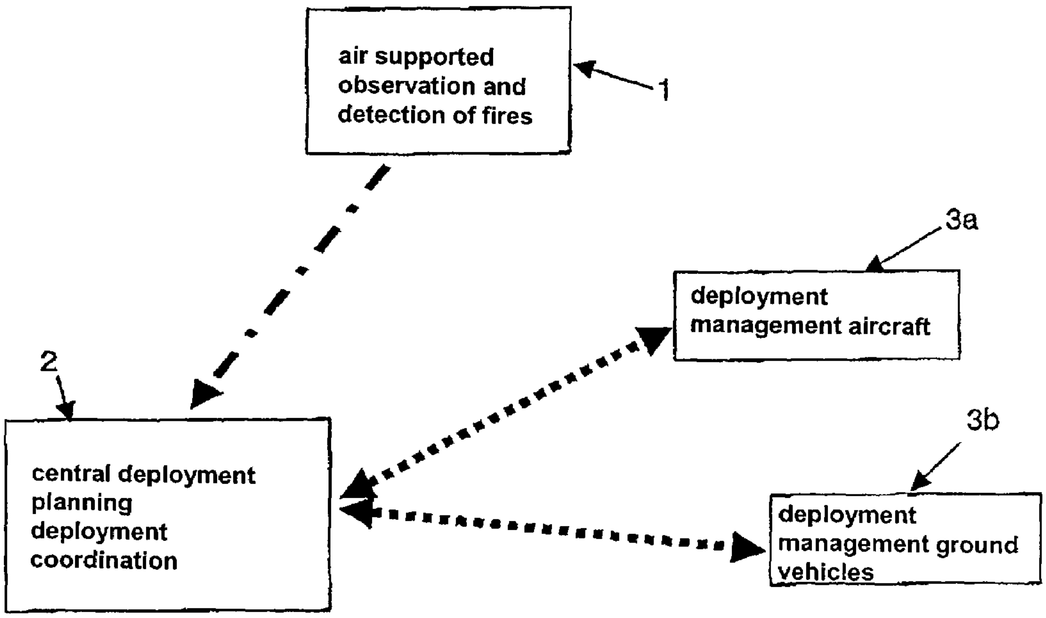
FIG. 1 shows the individual components of the method of the invention and their interaction.

FIG. 1 shows the individual components of a method of the invention and their interaction. The observation and detection of fires is done on board an aircraft 1 using a georeferenced heat image. The coordinates of the hot points on the image caused by a fire are transmitted through a data link to a deployment center 2 for deployment planning, deployment coordination and in some cases deployment supervision. The deployment plans generated in the center 2 are passed on to the on-board management systems of the deployed vehicle, which can be a fire truck 3*b* and/or aircraft 3*a*. The current location data of the deployed vehicles as well as other relevant data can be transmitted via the data link to the deployment center 2. The components of the method described are further explained hereinafter.

Figure 2:
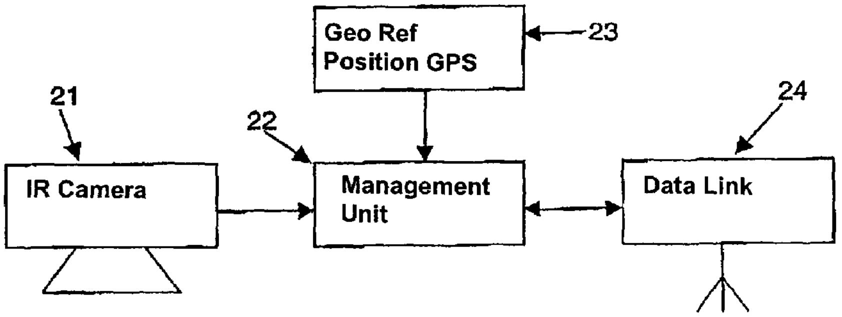
FIG. 2 shows the component for observing and detecting fires.

Component for Observation and Detection of Fires (FIG. 2)

Fire observation from the air that is today practiced is based on visual evaluation by pilots or fire observers. The detection of centers of concern by the observation of smoke is primary. If smoke is observed from the air, the observer sends an estimate of the location to the ground center, where the fire-fighting is then initiated.

In the method of the invention, the fire observer is replaced in a high-altitude observation aircraft by an infrared camera with georeferencing equipment. The camera detects not just smoke but even hot spots which do not directly amount to outright smoking. Plausibility methods employed in the evaluation of the infrared data assure that it does not cause constant false alarms due to temporary hot spots, such as automobile engines. Moreover, the camera provides a definitely greater area of coverage than a human observer can, due to limitations of visibility. The data obtained by the observation camera are continually conveyed to a center on the ground and represented on a supervision and deployment map with the aid of the geographic coordinates in a planning and display system. If heat caused by a fire occurs, a hot spot appears on the map to indicate a possible outbreak. Also, a precise geographic location is associated with the report of the elevated temperatures. Each definitely excessive temperature is as a rule to be related to a fire. Thus, with knowledge of the location of this excessive temperature rise immediate countermeasures can be initiated. As a rule, a countermeasure of this kind can be the sending of an alarm to a fire guard situated near the fire, by whom the appropriate observation and fire-fighting measures can be initiated on the ground.

A fire cannot always be combated directly. If fires spread, the observation camera in the air takes on an additional task. By continuously monitoring the overall situation in a very great area of observation and transmitting the data to the center on the ground, it is possible to indicate and steadily follow up the fire areas and flame fronts and their heading. Thus the effectiveness of the countermeasures is constantly checked and the development of threats to personnel on the ground, such as extremely rapidly shifting flame fronts, restrictions of movement, and escape routes, and possible entrapments, can be detected early and the affected personnel can be warned and protected.

The observation component consists, as shown in FIG. 2, of three elements. On board an observation aircraft is an infrared camera 21 which steadily takes a heat picture of the ground over which the plane is flying and can detect so-called hot spots or hot areas by relative comparison with data on hand. By correlating the heat image with the position of the aircraft in an on-board computer 22, the heat picture can be georeferenced. GPS receivers 23 can be used in flight. An accuracy of location of around 30 meters is sufficient for this referencing. The data obtained are transmitted by a data radio system 24 to a center on the ground. Since the on-board data have already been processed, the transmission bandwidth does not have to satisfy stringent requirements. As a rule a conventional aircraft radio (preferably in the NAV band) can be used in this data system.

Figure 3:
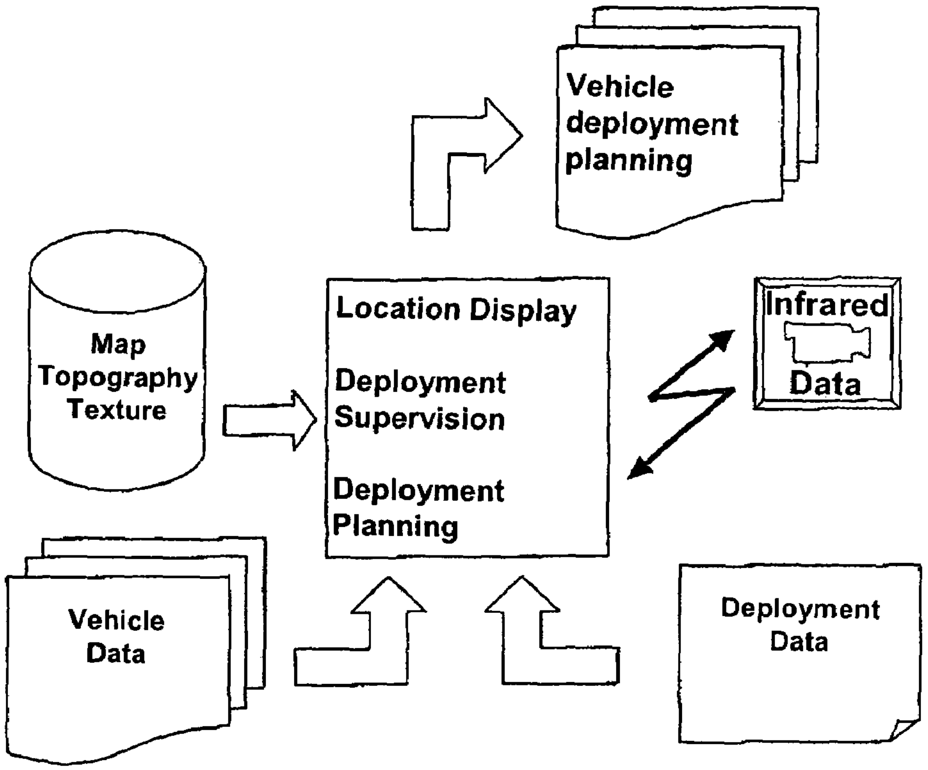
FIG. 3 shows the component for deployment and coordination.
Figure 4:
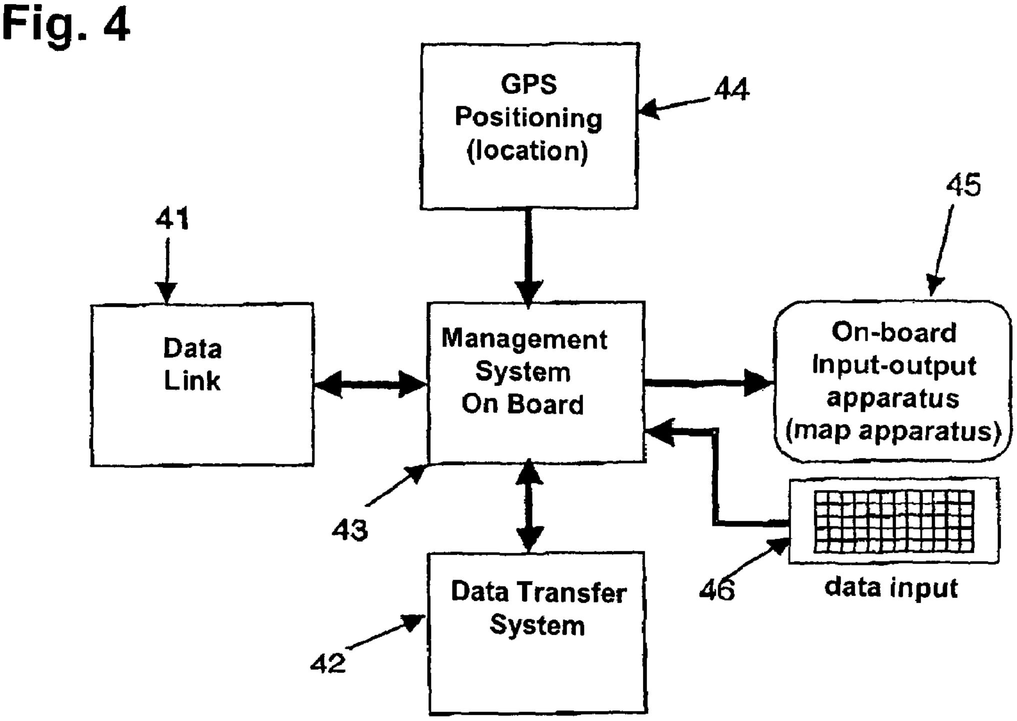
FIG. 4 shows the component for mobile air and ground management.

Component for Deployment Planning and Coordination (FIG. 3)

A planning computer in the deployment center 2 on the ground (PC) has a data bank including:

Map data of a region to be observed and represented,

Data on the topography and nature of this region,

Data on roads and streets with information of their present loading capacity and suitability for the use of the fire-fighting vehicles, Data on local availability of water and fire-fighting equipment, Data on infrastructure for the use of fire-fighting aircraft and helicopters, Data on vehicles and aircraft regarding technical equipment, fire extinguishers, number of fire extinguishers, specific vehicle and aircraft information such as weight, capacity, power profiles (in the case of fire-fighting aircraft and helicopters for figuring employability, flying range and ability to dump fire-fighting agents), and Data on location of vehicles (ground and air) in regard to fleet management systems.

These data are supplemented with:

Current weather and wind information,

Infrared surface observation data from the observation aircraft, and

Up-to-date practical data on availability of highways, roads and equipment.

The computer is thus able to produce a clear deployment image on one or more displays. All information relevant to the deployment can be displayed on the map of the area under observation. In addition to the built-up areas and the terrain, this includes roads and highway networks, tactical data, for example on the location of the work forces, data on the infrastructure and, of course, information on the progress of the fire itself correlated with the geographical map.

In addition to the display of data related to the deployment, the computer has a second important task. With knowledge of the specific data on all the deployed vehicles, it is possible to draw up plans for the use of fire-fighting aircraft, fire trucks and helicopters. At the same time, deployment plans and flight profiles optimized on the basis of the various deployment and flying abilities are computed so as to achieve optimum fire-fighting efforts.

In addition to the plans for the individual vehicles, coordinated fleet deployment plans can thus be determined. The calculated data and deployment plans are conveyed to the deployed crews (radios, software media) and are entered into appropriate management systems on board the vehicles. These plans, transferred to the deployment management systems, now permit the coordinated use of the vehicles participating in an action (ground or air) in order to optimize the fire-fighting.

The chain of operations, including monitoring in the deployment center, deployment planning, and coordination, is completed by the element for deployment supervision and for the evaluation of the effectiveness of the deployment. The effect of the deployment can be learned and displayed in real time in the situational view. An optimization of the battle at the fire front can be performed directly. This includes route optimization when the equipment is started up, as well as the decentralization and adjustment of plans for deploying fire-fighting aircraft and helicopters in order to optimize fire-fighting results. This is accompanied by the increase in the safety of the deployment of fire-fighting aircraft and helicopters by coordinating flight paths and profiles.

Effectiveness supervision is assisted by local observation as well as by aerial observation with the use of thermal imaging technology. Thus the proposed process constitutes a complete system for monitoring and planning for combating surface and forest fires over large areas of land.

Component for Managing Mobile Air and Ground Deployment

The deployment plans and data for firefighting with ground and air support which have been estimated and coordinated in the base computer can be transferred to the aircraft and ground vehicles in at least three ways.

The on-board management system of each deployed vehicle (ground and air) has a data link 41 by which the data from the planning computer in the deployment center can be transferred to the particular vehicle. Thus, when adaptations of the planning are necessary, a fast exchange of data between the ground center and the deployed vehicles is assured. Since this data link is a bidirectional connection, it is possible at any time to transmit data from the ground center, such as location and conditions, to the deployed vehicles on the ground and displayed therein or used for updating plans.

The planning data can alternatively be copied onto a data disk by the planning computer on the ground and read from the disk with a reader 42 in the on-board management computer 43. This data transfer can also be used in the opposite direction to transmit on-board data to the deployment center in order, for example, to then evaluate deployment profiles in the deployment center on the ground and display and analyze the entire operation.

In the third case the data from a deployment plan can be transferred by manual entry through an input keyboard 48 into the on-board system. This method of input is especially appropriate whenever, for example, slight changes of plan have to be executed quickly.

For land vehicles these plans contain optimized starting and running plans, data on loading fire-fighting materials and deployment instructions for direct fire-fighting. The deployment data are shown on a graphic display 45 inside the vehicle. Based on these data the vehicle can run and be used in coordination with all other vehicles involved in the deployment. At the same time it steadily transmits its specific location and status obtained from GPS 44 to the center where it can be represented in a deployment overview in association with other vehicles.

For aircraft and helicopters, the deployment plans contain deployment elevations, routes for flying to fire-fighting points and coordinates of the best locations for dumping the extinguishing materials. Furthermore, time data can be made available for the coordination of various aircraft within a restricted airspace. Thus the deployment of several aircraft can be performed to improve fire-fighting actions while avoiding collision. All data relating to the deployment are shown to the crew in the aircraft on an appropriate display 45. Information critical to the deployment, such as the dumping point for the firefighting material, can also be given acoustically if necessary.

By communicating the current location of all aircraft in operation via datalink 41, based on the location obtained by GPS, a comprehensive display of the vehicles deployed and their location can be given in the deployment center.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for the detection and combating of forest and surface fires, comprising:

observing and detecting fires using an infrared camera on board an observation aircraft;

georeferencing images obtained by the infrared camera pixel-wise using location data of the observation aircraft obtained by a navigation system;

testing the georeferenced infrared image for hot points caused by a fire, and transmitting coordinates of the hot points via a data link to a central data processing system on the ground;

automatically generating deployment plans for available firefighting vehicles in the central data processing system, taking into consideration data relating to the terrain and data on available firefighting equipment;

transferring the deployment plans generated in the central data processing system to on-board management systems of deployed vehicles;

representing deployment data and coordinates corresponding to the deployment plans via output apparatus of the on-board management systems of the deployed vehicles;

the deployed vehicles carrying out fire-fighting based on the data displayed by the on-board management systems;

detecting actual deployment results and evaluating the effectiveness of the deployment in the central data processing system;

said central data processing system computing simulated results of the generated deployment plans and their effects; and comparing effectiveness of the detected deployment results with the computed simulated results.

2. The method according to claim 1, further comprising using the central data processing apparatus to reproduce the positions of the hot points on a deployment map to show the overall situation.

3. The method according to claim 2, wherein said step of generating deployment plans takes into consideration coordinated participation of airborne and earth-bound deployment vehicles.

4. The method according to claim 3, further comprising conveying deployment-relative data and locations of the deployment vehicles by the on-board management system via data link to the central data processing apparatus.

5. The method according to claim 4, further comprising obtaining the locations of the deployment vehicles using location data of a satellite navigation system.

6. The method according to claim 5, wherein said step of detecting deployment outcome is performed using the infrared camera in the observation aircraft, and the detected deployment outcome is conveyed to the central data processing system.

7. The method according to claim 1, further comprising using the central data processing apparatus to automatically generate changes in plans to optimize the fire-fighting on the basis of evaluation of the effectiveness of the deployment.

8. The method according to claim 1, further comprising analyzing a deployment by transferring data recorded on board the deployed vehicles after the deployment is completed.

9. The method according to claim 1, wherein said step of generating deployment plans takes into consideration coordinated participation of airborne and earth-bound deployment vehicles.

10. The method according to claim 1, further comprising conveying deployment-relative data and locations of the deployment vehicles by the on-board management system via data link to the central data processing apparatus.

11. The method according to claim 10, further comprising obtaining the locations of the deployment vehicles using location data of a satellite navigation system.

12. The method according to claim 1, wherein said step of detecting deployment outcome is performed using the infrared camera in the observation aircraft, and the detected deployment outcome is conveyed to the central data processing system.

13. The method according to claim 12, further comprising using the central data processing apparatus to automatically generate changes in plans to optimize the fire-fighting on the basis of evaluation of the effectiveness of the deployment.

14. The method according to claim 13, further comprising analyzing a deployment by transferring data recorded on board the deployed vehicles after the deployment is completed.

15. The method according to claim 1, wherein said deployment plans include:

optimized starting and running plans, specification of fire fighting materials, and deployment instructions for direct fire fighting, for deployed land vehicles; and deployment altitudes, routes for flying to fire fighting points and optimal locations for dumping extinguishing materials, for deployed air vehicles.

* * * * *